United States Patent
Niimi

(10) Patent No.: US 7,371,704 B2
(45) Date of Patent: May 13, 2008

(54) SINTERED BODIES OF YTTRIUM-ALUMINUM GARNET, A METHOD OF PRODUCING THE SAME AND SINTERING AID THEREFOR

(75) Inventor: Norikazu Niimi, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 494 days.

(21) Appl. No.: 10/728,956

(22) Filed: Dec. 8, 2003

(65) Prior Publication Data

US 2004/0135295 A1 Jul. 15, 2004

(30) Foreign Application Priority Data

Dec. 25, 2002 (JP) ............................. 2002-373525
Oct. 27, 2003 (JP) ............................. 2003-365837

(51) Int. Cl.
*C04B 35/10* (2006.01)
*C04B 35/115* (2006.01)

(52) U.S. Cl. ...................... 501/127; 501/152; 501/153; 264/656; 264/659; 264/676

(58) Field of Classification Search ................ 501/127, 501/152, 153; 264/656, 674, 647, 659; 423/412
See application file for complete search history.

(56) References Cited

U.S. PATENT DOCUMENTS

| | | | |
|---|---|---|---|
| 4,609,631 A * | 9/1986 | Messier et al. ................ 501/35 |
| 4,745,091 A * | 5/1988 | Landingham ................ 501/87 |
| 4,841,195 A | 6/1989 | De With et al. |
| 4,940,678 A * | 7/1990 | Aitken ......................... 501/73 |
| 5,124,284 A * | 6/1992 | Ishida et al. ................ 501/98.5 |
| 5,298,470 A * | 3/1994 | Chia et al. ..................... 501/89 |
| 5,314,850 A * | 5/1994 | Miyahara ................... 501/98.4 |
| 6,225,249 B1 * | 5/2001 | Fujita et al. ................ 501/98.4 |
| 6,383,964 B1 * | 5/2002 | Nakahara et al. ........... 501/152 |
| 6,403,510 B1 * | 6/2002 | Kuibira et al. ............. 501/98.5 |
| 6,454,822 B1 * | 9/2002 | Rosenflanz .................. 51/309 |

FOREIGN PATENT DOCUMENTS

| JP | A 5-286761 | 11/1993 |
|---|---|---|
| JP | 06-107456 A | 4/1994 |
| JP | 11-071184 A | 3/1999 |
| JP | 11-130428 A | 5/1999 |
| JP | 2001-089225 A | 4/2001 |
| JP | 2001-270775 A | 10/2001 |

\* cited by examiner

*Primary Examiner*—Roy King
*Assistant Examiner*—Ngoclan T. Mai
(74) *Attorney, Agent, or Firm*—Oliff & Berridge, PLC

(57) ABSTRACT

An object of the present invention is to lower the sintering temperature required for a sintered body of yttrium-aluminum garnet, to improve the corrosion resistance of the sintered body and to prevent the reduction of the transmittance thereof. A sintered body of yttrium-aluminum garnet is produced from a source compound for yttrium and a source compound for aluminum using aluminum nitride as a sintering aid. It maybe considered that aluminum nitride reacts with alumina and yttria to generate liquid phase and to reduce the sintering temperature during the sintering process.

19 Claims, No Drawings

SINTERED BODIES OF YTTRIUM-ALUMINUM GARNET, A METHOD OF PRODUCING THE SAME AND SINTERING AID THEREFOR

This application claims the benefits of Japanese Patent Applications P2002-373525 filed on Dec. 25, 2002 and P2003-365837 filed on Oct. 27, 2003, the entireties of which are incorporated by reference.

BACKGROUND OF THE INVENTION

1. Field of the Invention

The present invention relates to a method of producing a sintered body of yttrium-aluminum garnet, a sintering aid therefor, and a sintered body produced by the method.

2. Related Art Statement

Yttrium-aluminum garnet ($Y_3Al_5O_{12}$: YAG) ceramics has an excellent transmittance over a wide range of wavelengths from visible to infrared lights. Applications of the ceramics such as a substitute material for a sapphire window, a material for a vessel for a discharge lamp and a corrosion resistant member have been studied.

Yttrium-aluminum garnet, however, has a melting point of about 1950° C. and thus requires a high sintering temperature so that the reduction of the production cost is rather difficult. For example, according to a Japanese Patent publication 5-286, 761A, alumina powder and yttria powder are mixed with a sintering aid added, shaped and sintered at 1600 to 1860° C. The sintering aid includes lithium oxide, sodium oxide, magnesium oxide, calcium oxide and silicon oxide.

SUMMARY OF THE INVENTION

The present inventor has studied to use a sintered body of yttrium-aluminum garnet for a discharge vessel of a high pressure discharge lamp (for example, a metal halide lamp or mercury lamp). Such high pressure discharge lamp has been expected as a light source for a head lamp for an automobile or a projector. The reason is as follows. The sintered body of yttrium-aluminum garnet has a high transmittance so that discharge arc in a discharge vessel can be utilized as a point light source by making the discharge vessel of the sintered body.

It is possible to reduce the sintering temperature required for producing a sintered body of yttrium-aluminum garnet by adding the sintering aids disclosed in the Japanese Patent publication 5-286, 761A. These sintering aids, however, may tend to remain in the resulting sintered body so that the corrosion resistance of the sintered body against a corrosive gas such as a halide gas may be deteriorated. Specifically, when the light emission from the discharge vessel is continued over a long time period, the transmittance of the discharge vessel tends to be reduced over time.

An object of the present invention is to lower the sintering temperature required for a sintered body of yttrium-aluminum garnet, to improve the corrosion resistance of the sintered body and to prevent the reduction of the transmittance thereof.

The present invention provides a method of producing a sintered body of yttrium-aluminum garnet from a source compound for yttrium and a source compound for aluminum using aluminum nitride as a sintering aid.

The present invention further provides a sintered body of yttrium-aluminum garnet obtained by the above method.

The present invention still further provides a sintering aid used for producing a sintered body of yttrium-aluminum garnet from a source compound for yttrium and a source compound for aluminum, the sintering aid comprising aluminum nitride.

The present inventor has reached an idea of adding aluminum nitride as a sintering aid in producing a sintered body of yttrium-aluminum garnet. The added aluminum nitride may react with alumina and yttria to generate liquid phase and thereby to facilitate the sintering process. Moreover, aluminum nitride may chemically change to garnet phase or the other crystalline phase which does not affect the transmittance or corrosion resistance during the sintering process. It is thus possible to prevent the reduction of corrosion resistance and transmittance of the garnet.

Although the behavior of aluminum nitride during the sintering process is not clear, the following mechanisms may be speculated.

(1) AlN chemically changes to garnet phase

AlN reacts with $Y_2O_3$ and $Al_2O_3$ to generate liquid phase to contribute to liquid phase sintering process. AlN then reacts with oxygen to generate $Al_2O_3$ and $N_2$. $N_2$ is then dissipated into atmosphere. The thus generated $Al_2O_3$ reacts with excessive $Y_2O_3$ in the matrix of the garnet to generate yttrium-aluminum garnet.

(2) AlN chemically changes to and remains as a chemically stable phase

AlN changes to chemically stable AlON phase ($\gamma$ phase). Moreover, AlON phase ($\gamma$ phase) is of cubic system and optically isotropic. The thus generated AlON phase does not result in the reduction of transmittance of yttrium-aluminum garnet to preserve excellent transmittance of a sintered body of yttrium-aluminum garnet.

These and other objects, features and advantages of the invention will be appreciated upon reading the following description of the invention when taken in conjunction with the attached drawings, with the understanding that some modifications, variations and changes of the same could be made by the skilled person in the art.

PREFERRED EMBODIMENTS OF THE INVENTION

The source compound for yttrium and source compound for aluminum may be an oxide or a precursor compound for generating an oxide upon heating. Such precursor compound includes salts such as a sulfate and nitrate and an alkoxide.

The inventive sintered body may be produced by any processes including the followings.

(1) A source compound for yttrium and source compound for aluminum are mixed and calcined to generate a calcined body of yttrium-aluminum garnet. The calcined body is then granulated to obtain powder, to which aluminum nitride is added, mixed and sintered.

(2) Source compounds for yttrium and aluminum and aluminum nitride are mixed and sintered.

In the above processes (1) and (2), the mixtures may be preferably shaped. The shaping methods include extrusion, injection molding, press molding, gel cast molding and doctor blade process.

The sintering process includes sintering at an ambient pressure, hot pressing and hot isostatic pressing.

In a preferred embodiment, alumina powder and yttria powder are mixed, to which an organic solvent such as an alcohol or distilled water is added and mixed in a pot mill. The thus mixed powder is dried at a reduced pressure or ambient pressure. The thus obtained homogeneous mixed powder is shaped by means of uniaxial press or cold isostatic press or the like to obtain a shaped body having a predetermined shape. The shaped body is then calcined at 1400 to 1550° C. to obtain a calcined body of yttrium-aluminum garnet. The calcined body is then granulated and aluminum nitride is added thereto, and a non-aqueous solvent and organic binder are added to obtain a mixture, which is then mixed in a pot mill for 12 to 48 hours. The thus mixed powder is dried under a reduced or ambient pressure. The resulting homogeneous mixed powder is shaped by means of an uniaxial press, cold isostatic press or the like to obtain a shaped body having a predetermined shape. The shaped body is then dewaxed at a temperature of, for example, 500 to 1300° C. and sintered at a temperature of 1600 to 1900° C. for 5 to 100 hours under non-oxidizing atmosphere (for example, hydrogen gas, vacuum or nitrogen gas) to obtain a sintered body of a high density yttrium-aluminum garnet.

According to the process of the present invention, the sintering process may preferably be performed under a reducing atmosphere. The reducing atmosphere may preferably contain hydrogen. The reducing atmosphere may more preferably contain nitrogen, the balance be a reducing gas such as hydrogen.

The content of nitrogen may preferably be 10 percent or higher and 60 percent or lower in a reducing atmosphere, so as to further improve the transmittance of the resulting wintered body. It is considered that AlN may be stabilized and liquid phase sintering may be facilitated due to the action of AlN in a reaction system during the sintering process, by increasing the content of nitrogen in a reducing atmosphere to 10 percent or higher. On the viewpoint, the content of nitrogen in a reducing atmosphere may more preferably be 20 percent or higher. It is further considered that AlN may be properly oxidized to generate alumina to facilitate the generation of the garnet, by reducing the content of nitrogen in a reducing atmosphere to 60 percent or lower. On the viewpoint, the content of nitrogen may more preferably be 50 percent or lower and most preferably be 40 percent or lower.

It is possible to further improve the linear transmittance during the thus obtained sintered body by adjusting the dew point of the atmosphere for the sintering process. By preserving an appropriate amount of moisture in the atmosphere during the sintering process, an appropriate amount of oxygen can be supplied into the reaction system due to chemical equilibrium. The generation of alumina may be thus facilitated due to the oxidation of AlN and the generated alumina may be supplied into the matrix of the garnet phase. On this viewpoint, the dew point of the atmosphere during the sintering process may more preferably be −5° C. or higher. Alternatively, the dew point of the atmosphere may more preferably be +5° C. or lower.

Further, in a preferred embodiment, a shaped body containing a source compound for yttrium, a source compound for aluminum and aluminum nitride is dewaxed at a temperature of 800° C. or higher and 1300° C. or lower to obtain a dewaxed body. It is generally said that the oxidation of AlN (conversion to $Al_2O_3$) is considerable at a temperature over about 700° C. In a reaction system containing a source compound for yttrium, a source compound for aluminum and aluminum nitride, it is generally to be avoided to perform a thermal process at a temperature over 700° C. under air. It is, however, found that the linear transmittance of the resulting sintered body can be improved by performing dewaxing (calcination) at a temperature of 800 to 1300° C. beyond expectation, although the reasons are not clear.

It is possible to improve the strength of a dewaxed body to facilitate the handling of the dewaxed body and to improve the linear transmittance of the sintered body, by elevating the temperature for dewaxing to 800° C. or higher. On the viewpoint, the dewaxing temperature may more preferably be 900° C. or higher, and most preferably be 1000° C. or higher. Further, it is possible to improve the linear transmittance of the resulting sintered body, by reducing the dewaxing temperature to 1300° C. or lower. On the viewpoint, the dewaxing temperature may more preferably be 1200° C. or lower and most preferably be 1100° C. or lower.

In a preferred embodiment, a molar ratio (Y/Al) of yttrium to aluminum contained in the source compound for yttrium and source compound for aluminum is 0.59 to 0.62. On the other words, the molar ratio (Y/Al) of yttrium to aluminum contained in the source compounds for yttrium and aluminum is made substantially same as the stoichiometric composition of the garnet phase. The molar ratio means that in the raw materials. The molar ratio (Y/Al) of 0.59 to 0.62 should be substantially identical with stoichiometric composition of the garnet phase in the sintered body.

In another preferred embodiment, a molar ratio (Y/Al) of yttrium to aluminum contained in the source compounds for yttrium and aluminum and aluminum nitride is 0.59 to 0.62. On the other words, the molar ratio (Y/Al) of yttrium to aluminum contained in the source compounds for yttrium and aluminum and aluminum nitride is made substantially same as the stoichiometric composition of the garnet phase. In this embodiment, when substantially the whole of AlN is chemically utilized as a source for the garnet phase, the composition of the garnet in the sintered body should be identical with the stoichiometric composition.

In a still another embodiment, a molar ratio (Y/Al) of yttrium to aluminum contained in the source compounds for yttrium and aluminum is 0.61 to 0.63, and a molar ratio (Y/Al) of yttrium to aluminum contained in the source compounds for yttrium and aluminum and aluminum nitride is 0.59 to 0.62.

In the present embodiment, when the added aluminum nitride is chemically changed to AlON, the molar ratio (Y/Al) of yttrium to aluminum in crystalline phases other than AlON phase in the sintered body would be 0.59 to 0.62. On the contrary, when the whole amount of the added aluminum nitride is chemically utilized as a source for aluminum atoms in the garnet phase, the molar ratio (Y/Al) of yttrium to aluminum in the sintered body would be 0.60 to 0.63. It is thus possible to substantially adjust the ratio (Y/Al) in the garnet phase in the sintered body at the stoichiometric composition of the garnet, when a part of the added aluminum nitride chemically changed to AlON and a part of the aluminum nitride is chemically changed to the garnet phase.

In a preferred embodiment, aluminum nitride is substantially absent in the sintered body of yttrium-aluminum garnet. As aluminum nitride is present in the sintered body, the transmittance tends to be reduced.

Further in a preferred embodiment, AlON phase is present in the sintered body of yttrium-aluminum garnet. The AlON phase does not adversely affect the transmittance or corrosion resistance of the sintered body of the garnet.

The aluminum nitride and AlON phases can be confirmed by, for example, a combination of a transmission electron microscope and EPMA.

Further, $YF_3$ may be utilized as a sintering aid for producing a sintered body of yttrium-aluminum garnet from source compounds of yttrium and aluminum. It is thus possible to reduce the sintering temperature to 1900° C. or lower, for example. During the sintering process, $YF_3$ reacts with alumina to generate YOF, which then reacts with alumina as follows.

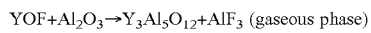
$$YOF + Al_2O_3 \rightarrow Y_3Al_5O_{12} + AlF_3 \text{ (gaseous phase)}$$

Y atoms in $YF_3$ are incorporated into the garnet phase as described above and F atoms in $YF_3$ are evaporated as gaseous phase, so that crystalline phases other than the garnet phase affecting the transmittance or corrosion resistance is not generated in the sintered body.

EXAMPLES

Example 1

$Y_2O_3$ powder ([BB] supplied by Shinetzu Chemical Co Ltd.) and $Al_2O_3$ powder ([UA-5100] supplied by Showa Denko Co. Ltd.) were mixed to obtain mixed powder, which was then heated at 1500° C. to obtain a calcined body of yttrium-aluminum garnet. The calcined body was granulated to obtain calcined powder. 0.5 weight parts of AlN powder ([F grade] supplied by Tokuyama) was added to 100 weight parts of the calcined powder. A non-aqueous solvent and a binder were added to the powder and mixed in a resin pot mill for 48 hours. The ratio (Y/Al) (molar ratio) was adjusted at 0.600 in the whole of $Y_2O_3$ powder, $Al_2O_3$ powder and AlN powder. The thus obtained mixture was shaped by gel cast molding, dewaxed at 500 to 600° C. and sintered at 1850° C. for 3 hours in non-oxidizing atmosphere.

The thus obtained sintered body was processed to obtain a disk shaped sample having a diameter of 10 mm and thickness of 1 mm. The disk shaped sample had a linear transmittance of 65 percent. The disk shaped sample, a halide gas of Dy—Tl—Na—I system and mercury were filled in an ample of quartz and then heated at 1100° C. for 2000 hours. The sample was then removed from the ample, and the linear transmittance was measured and proved to be 52 percent. Aluminum nitride phase was not identified in the sintered body. Although the ratio (Y/Al) (molar ratio) was adjusted at 0.600 in the whole of $Y_2O_3$ powder, $Al_2O_3$ powder and AlN powder in the present example, the same results are obtained when the ratio is 0.60.

Comparative Example 1

A sintered body was produced according to the same procedure as the example 1, except that $SiO_2$ was added as a sintering aid in an amount of 0.1 weight parts to 100 weight parts of the raw powdery materials. The ratio of $Y_2O_3$ powder and $Al_2O_3$ powder in the mixture corresponds to stoichiometric composition corresponding to that of the garnet phase.

The thus obtained sintered body was processed to obtain a disk shaped sample having a diameter of 10 mm and thickness of 1 mm. The disk shaped sample had a linear transmittance of 63 percent. The disk shaped sample, a halide gas of Dy—Tl—Na—I system and mercury were filled in an ample of quartz and then heated at 1100° C. for 2000 hours. The sample was then removed from the ample, and the linear transmittance was measured and proved to be 15 percent.

Example 2

$Y_2O_3$ powder and $Al_2O_3$ powder were mixed to obtain mixed powder, which was then heated to obtain a calcined body of yttrium-aluminum garnet. The ratio of $Y_2O_3$ powder and $Al_2O_3$ powder was adjusted at the stoichiometric composition corresponding to the composition of the garnet. The calcined body was granulated to obtain calcined powder, to which AlN powder was added. A non-aqueous solvent and a binder were added to the powder and mixed in a ball mill. The thus obtained mixture was shaped, dewaxed at 500 to 600° C. and sintered under non-oxidizing atmosphere. Aluminum nitride phase was not identified and AlON phase was identified in the resulting sintered body.

Example 3

$Y_2O_3$ powder ([BB] supplied by Shinetzu Chemical Co Ltd.) And $Al_2O_3$ powder ([UA-5100] supplied by Showa Denko Co. Ltd.) were mixed to obtain mixed powder, which was then heated at 1500° C. to obtain a calcined body of yttrium-aluminum garnet. The calcined body was granulated to obtain calcined powder. 0.5 weight parts of AlN powder ([F grade] supplied by Tokuyama) was added to 100 weight parts of the calcined powder. A non-aqueous solvent and a binder were added to the powder and mixed in a ball mill for 48 hours. The ratio (Y/Al) (molar ratio) was adjusted to 0.600 in the whole of $Y_2O_3$ powder, $Al_2O_3$ powder and AlN powder. The thus obtained mixture was shaped with gel cast molding and dewaxed at 1100° C. for 1 hour.

The thus obtained dewaxed body was then sintered at 1850° C. for 2 hours under atmosphere consisting of hydrogen and nitrogen. The dew point of the atmosphere was adjusted at +3° C. The ratio of hydrogen and nitrogen in the atmosphere was changed as shown in table 1. Each sample was subjected to grinding and lapping to obtain a disk shaped sample having a diameter of 10 mm and thickness of 1 mm. The results of measurement of the transmittances of the samples were shown in table 1. In the column of "Judgement" in the table 1, "Δ" was depicted when the linear transmittance was 49 percent or lower, "○" was depicted when the transmittance was 50 percent or higher and 59 percent or lower, and "⊙" was depicted when the transmittance was 60 percent or higher. It was finally proved that the linear transmittance of the sintered body can be considerably improved by adjust the content of nitrogen to a value of 10 to 60 percent. Although the ratio (Y/Al) (molar ratio) was adjusted at 0.600 in the whole of $Y_2O_3$ powder, $Al_2O_3$ powder and AlN powder in the present example, the same results are obtained when the ratio is 0.60.

TABLE 1

| $H_2/N_2$ (%) | Linear transmittance (%) | Judgement |
|---|---|---|
| 100/0 | 40 | Δ |
| 90/10 | 55 | ○ |
| 80/20 | 70 | ⊙ |
| 70/30 | 70 | ⊙ |
| 60/40 | 70 | ⊙ |
| 50/50 | 65 | ⊙ |
| 40/60 | 55 | ○ |
| 30/70 | 45 | Δ |
| 20/80 | 35 | Δ |

Example 4

Sintered bodies were produced according to the same procedure as the example 3, except that the sintering was carried out at the maximum temperature of 1850° C. for 2 hours under atmosphere of hydrogen 70 percent/nitrogen 30 percent. The dew point of the atmosphere during the sintering was changed as shown in table 2. The linear transmittance of each sample was measured as the same procedure as the example 3, and the results were shown in table 2. It was finally proved that the linear transmittance can be considerably improved by adjusting the dew point of the atmosphere from −10° C. to +10° C.

TABLE 2

| Dew point (° C.) | Linear transmittance (%) | Judgement |
|---|---|---|
| −20 | 45 | Δ |
| −10 | 55 | ○ |
| −5 | 70 | ⊙ |
| 0 | 70 | ⊙ |
| +5 | 70 | ⊙ |
| +10 | 55 | ○ |
| +15 | 40 | Δ |
| +20 | 35 | Δ |

Experiment 5

Sintered bodies were produced according to the same procedure as the example 3, except that the dewaxing was carried out at a dewaxing temperature shown in table 3 for 1 hour. The sintering was carried out at the maximum temperature of 1850° C. for 2 hours under atmosphere of hydrogen 70 percent/nitrogen 30 percent. The dew point of the atmosphere during the sintering was adjusted at minus 3° C. The linear transmittance of each sample was measured according to the same procedure as the example 3, and the results were shown in table 3.

Further, ease of handling was evaluated as follows for each dewaxed body and shown in table 3. That is, the dewaxed pellet having a diameter of 13 mm and thickness of 2 mm was dropped on a rubber plate having a thickness of 5 mm from various heights. The minimum height where the dewaxed body was broken was assigned as "L" (cm). The results were judged as follows.

Judgement:

$0 \leq L < 2 : x, \ 2 \leq L < 5 : \Delta, \ 5 \leq L < 7 : \bigcirc, \ 7 \leq L : \odot$

TABLE 3

| Temperature for Dewaxing (° C.) | Linear transmittance (%) | Ease of handling of dewaxed body (cm)/judgement |
|---|---|---|
| 600 | 50 | 1/X |
| 700 | 55 | 1/X |
| 800 | 55 | 3/Δ |
| 900 | 60 | 5/○ |
| 1000 | 65 | 6/○ |
| 1100 | 65 | 8/⊙ |
| 1200 | 60 | 10/⊙ |
| 1300 | 55 | 12/⊙ |
| 1400 | 40 | 15/⊙ |

It was possible to improve the linear transmission of the sintered body beyond expectation and to considerably improve the ease of handling of the dewaxed body at the same time, by elevating the dewaxing temperature to 800° C. or higher. Moreover, it is possible to improve the linear transmittance by maintaining the dewaxing temperature at 1300° C. or lower.

As described above, according to the present invention, the sintering temperature required for a sintered body of yttrium-aluminum garnet can be lowered, the corrosion resistance of the sintered body can be improved and the reduction of the transmittance can be prevented.

The present invention has been explained referring to the preferred embodiments. However, the present invention is not limited to the illustrated embodiments which are given by way of examples only, and may be carried out in various modes without departing from the scope of the invention.

The invention claimed is:

1. A method comprising the step of sintering a mixture comprising a source compound for yttrium, a source compound for aluminum, and aluminum nitride to produce a sintered body of yttrium-aluminum garnet, wherein aluminum nitride phase is not substantially present in said sintered body of yttrium-aluminum garnet.

2. The method of claim 1, wherein said source compound for yttrium comprises yttria and said source compound for aluminum comprises alumina.

3. The method of claim 1, wherein a molar ratio (Y/Al) of yttrium to aluminum is 0.59 to 0.62 contained in said source compound for yttrium and said source compound for aluminum.

4. The method of claim 1, wherein a molar ratio (Y/Al) of yttrium to aluminum is 0.59 to 0.62 contained in said source compound for yttrium, said source compound for aluminum and aluminum nitride.

5. The method of claim 1, wherein a molar ratio (Y/Al) of yttrium to aluminum is 0.61 to 0.63 contained in said source compound for yttrium and said source compound for aluminum, and wherein a molar ratio (Y/Al) of yttrium to aluminum is 0.59 to 0.62 contained in said source compound for yttrium, said source compound for aluminum and aluminum nitride.

6. The method of claim 1, wherein said sintered body of yttrium-aluminum garnet comprises AlON phase.

7. The method of claim 1, wherein the step of sintering is under a reducing atmosphere containing nitrogen in a ratio of 10 percent or higher and 60 percent or lower.

8. The method of claim 1, wherein the step of sintering is under an atmosphere having a dew point of −10° C. or higher and +10° C. or lower.

9. The method of claim 1, further comprising the steps of:
   forming a shaped body comprising said source compound for yttrium, said source compound of aluminum and aluminum nitride, and dewaxing the shaped body at a temperature of 800° C. to 1300° C. to obtain a dewaxed body; and
   sintering said dewaxed body to obtain the sintered body.

10. A method comprising:
   mixing a source compound for yttrium and a source compound for aluminum to produce a mixture;
   calcining the mixture to generate yttrium-aluminum garnet;
   introducing aluminum nitride to the yttrium-aluminum garnet; and
   sintering the mixture of the aluminum nitride and yttrium-aluminum garnet to produce a sintered body of yttrium-aluminum garnet.

11. The method of claim 10, wherein said source compound for yttrium comprises yttria and said source compound for aluminum comprises alumina.

12. The method of claim 10, wherein a molar ratio (Y/Al) of yttrium to aluminum is 0.59 to 0.62 contained in said source compound for yttrium and said source compound for aluminum.

13. The method of claim 10, wherein a molar ratio (Y/Al) of yttrium to aluminum is 0.59 to 0.62 contained in said source compound for yttrium, said source compound for aluminum and aluminum nitride.

14. The method of claim 10, wherein a molar ratio (Y/Al) of yttrium to aluminum is 0.61 to 0.63 contained in said source compound for yttrium and said source compound for aluminum, and wherein a molar ratio (Y/Al) of yttrium to aluminum is 0.59 to 0.62 contained in said source compound for yttrium, said source compound for aluminum and aluminum nitride.

15. The method of claim 10, wherein aluminum nitride is not substantially present in said sintered body of yttrium-aluminum garnet.

16. The method of claim 10, wherein said sintered body of yttrium-aluminum garnet comprises AlON phase.

17. The method of claim 10, wherein the step of sintering is under a reducing atmosphere containing nitrogen in a ratio of 10 percent or higher and 60 percent or lower.

18. The method of claim 10, wherein the step of sintering is under an atmosphere having a dew point of −10° C. or higher and +10° C. or lower.

19. The method of claim 10, further comprising the steps of:

forming a shaped body comprising said mixture of aluminum nitride and yttrium-aluminum garnet, and dewaxing the shaped body before the sintering.

* * * * *